Oct. 13, 1925.
P. B. PARKS ET AL
1,556,804
VALVE
Original Filed May 19, 1923    2 Sheets-Sheet 1
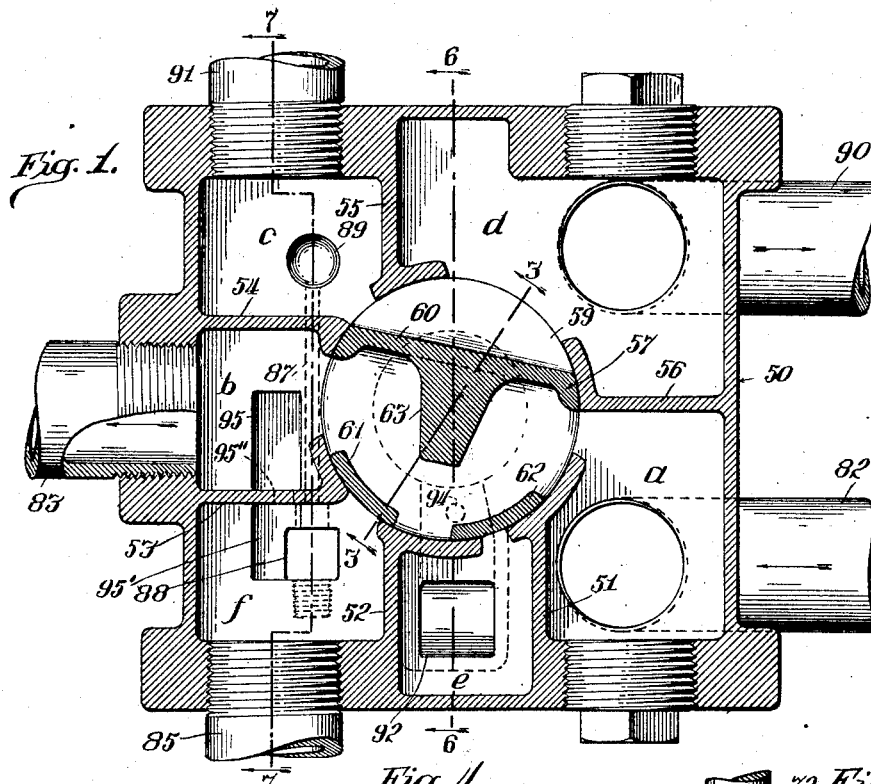
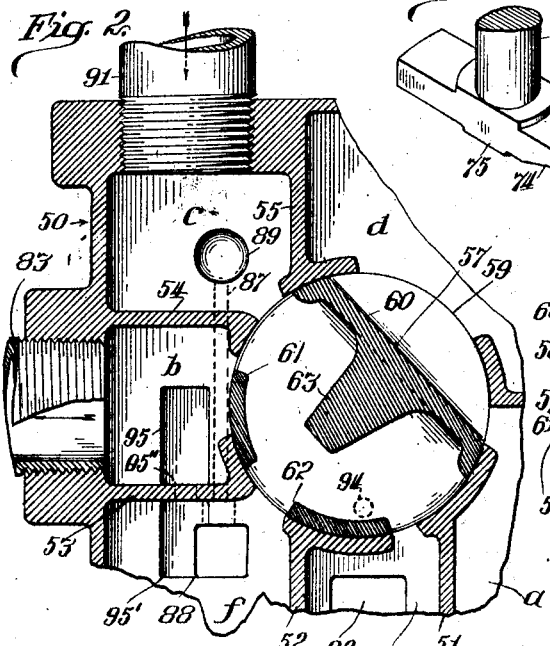
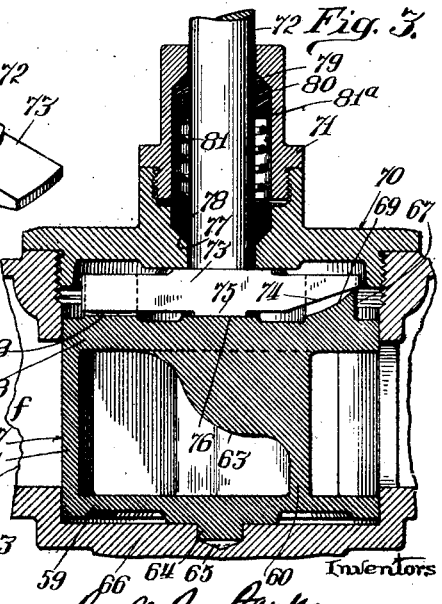

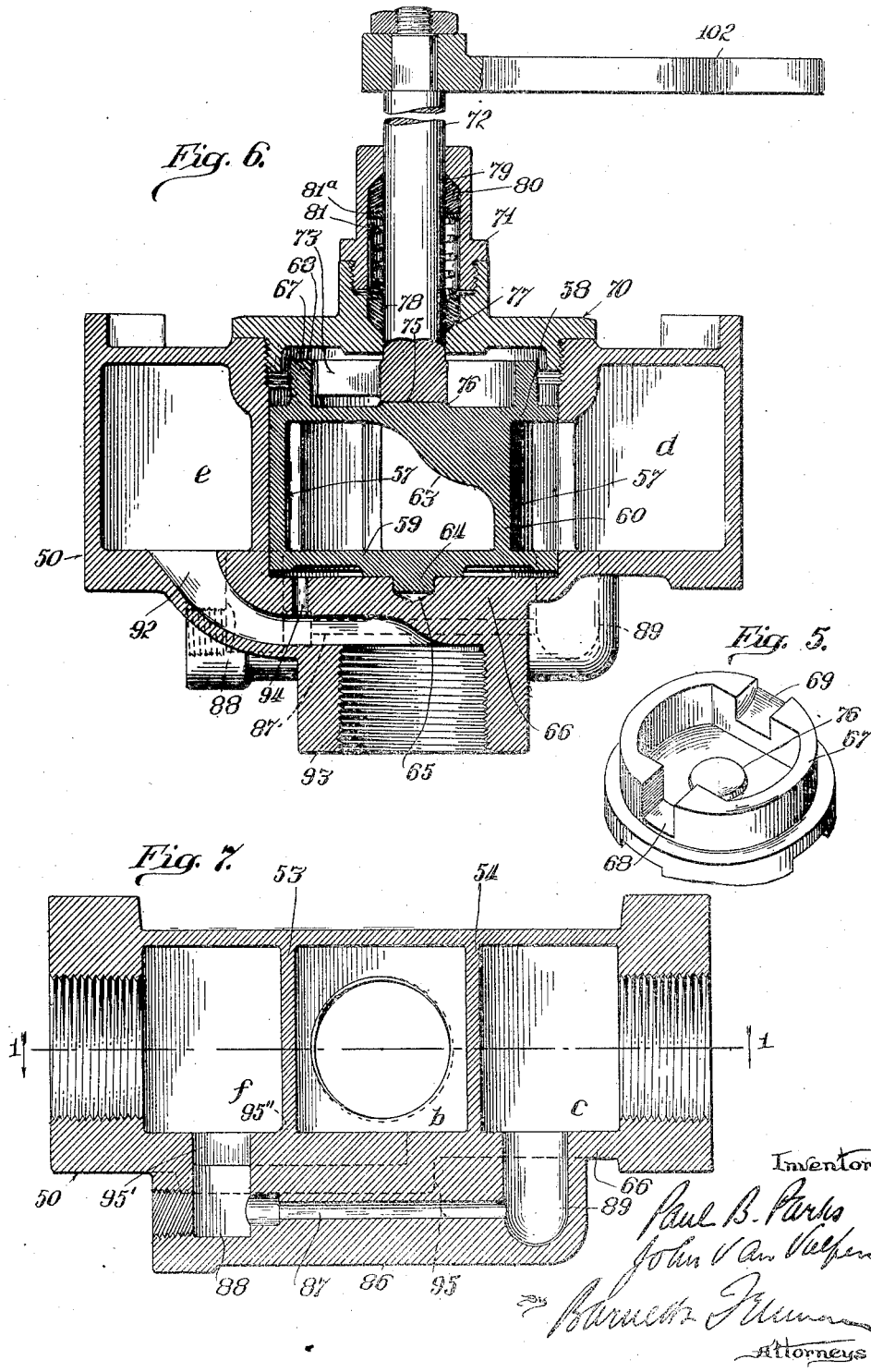

Patented Oct. 13, 1925.

1,556,804

UNITED STATES PATENT OFFICE.

PAUL B. PARKS, OF OAK PARK, AND JOHN VAN VULPEN, OF CHICAGO, ILLINOIS, ASSIGNORS TO VAPOR CAR HEATING COMPANY, INC., OF CHICAGO, ILLINOIS, A CORPORATION OF NEW YORK.

VALVE.

Original application filed May 19, 1923, Serial No. 640,133. Divided and this application filed April 18, 1924. Serial No. 707,435.

*To all whom it may concern:*

Be it known that we, PAUL B. PARKS and JOHN VAN VULPEN, citizens of the United States, residing at Oak Park, Illinois, and Chicago, Illinois, respectively, have invented certain new and useful Improvements in Valves, of which the following is a specification.

Our invention relates to a valve of the type comprising a chambered casing and a rotary valve body which, in one position, puts certain chambers of the casing in communication with each other, and shuts off these chambers from the remaining chambers which are put in communication one with another, and, in another position, changes the relationship of intercommunication between the chambers whereby, in accordance with the angular position of the valve body, the flow of fluids controlled by the valve may be determinately varied.

The valve is intended, more particularly, for use in connection with a railway car heating system, such as is shown in the patent to E. A. Russell, No. 1,440,701, granted January 2, 1923, and in a co-pending application filed by us on May 19, 1923, Serial No. 640,133, of which this application is a division. The present invention is not to be considered as limited to employment in a heating system since the valve may have applicability to other apparatus where the operating conditions are similar.

The invention herein described and claimed has in view reducing the friction and tendency of the valve body to stick, facilitating the manufacture of the parts, and making the operation of the device more certain and reliable.

Another object is to provide a valve of this sort with an additional port connecting certain of the chambers, for the purpose of drainage, which port is arranged so that it is liquid sealed against the escape of steam or other gas of relatively low pressure.

The invention is illustrated, in a preferred embodiment, in the accompanying drawings, wherein Fig. 1 is a sectional plan view of the valve, the pipes connected thereto being shown in full lines, this view being taken on line 1—1 of Fig. 7.

Fig. 2 is a view, similar to Fig. 1, but fragmentary in character, illustrating the valve body in a different position from that in which said valve body is shown in Fig. 1.

Fig. 3 is a vertical sectional view taken on line 3—3 of Fig. 1.

Fig. 4 is a view, in perspective, of the lower end of the shaft or stem for operating the rotatable valve body.

Fig. 5 is a view, in perspective, of the upper portion of the valve body.

Fig. 6 is a vertical sectional view of the valve, and

Fig. 7 is a vertical sectional view on line 7—7 of Fig. 1.

The radiator valve comprises a casing 50 divided by webs 51, 52, 53, 54, 55 and 56 into six chambers including a supply chamber *a*, a drip chamber *e*, a first return chamber *f*, an inlet chamber *b*, a second return chamber *c*, and a discharge chamber *d*, all of which are arranged around a central valve chamber containing a rotary valve body 57, the latter being composed of an upper disc 58, a lower disc 59 and vertical webs 60, 61 and 62, web 60 being reinforced by an enlargement 63, all of these separately enumerated parts of the valve body being preferably cast in a single integral structure. In referring hereafter to the central valve chamber we intend the space at the center of the casing which serves to put the other chambers in communication with each other, that is the space between the upper and lower discs 58 and 59 of the valve body. The lower disc 59 is formed with a stud 64 which enters a recess 65 in the bottom plate 66 of the valve casing 50. The upper disc 58 of the valve body is formed with a circular rib or boss 67 in which are cut diametrically arranged grooves 68, 69, the under surface of the latter being sloped, as indicated in Figs. 3 and 5. The valve casing is closed on the top by a bonnet 70 in which is fixed a gland 71. The operating stem 72 of the valve is made separate from the valve body, extends through the bonnet 70 and gland 71 and is formed at its lower end with a transverse head 73 entering the grooves 68, 69 in the boss 67 on the top of the valve body, the end of the head 73 designed to fit the groove 69 being tapered as indicated at 74. By this arrangement the head is irreversible with respect to the valve body for the purpose of avoiding possible error in assembly. The under surface of the head 73 is formed with a pad 75 to bear on a pad 76 on the top of the valve body. By constructing the interengaging parts of the valve stem and body in this manner a certain accommodation is provided which minimizes care in the assembly of the parts and facilitates the machining of such parts as require close fitting. With the valve stem integral or rigidly connected with the valve body, it was a matter of difficulty to produce a valve of this type which would turn freely.

Arranged in the bonnet 70 against a conical surface 77 thereof is a packing ring 78, of smaller diameter than the space in which it is arranged, formed with its lower end conical to fit surface 77. In the upper end of the gland 71 and arranged against a conical surface 79 thereof is a similar packing ring 80. A spiral spring 81 is interposed between washers 81ª bearing against the packing rings 78, 80. The packing rings 78, 80 are made of smaller diameter than the spaces in which they are located so that they may expand when the valve is heated up without interfering with the free movement of the valve stem. The packing rings, in practice turn with the valve stem. They are kept in sealing position against the bonnet 70 and gland 71 by the coiled spring 81. When wear takes place on the conical under surfaces of the packing rings looseness is prevented by the take-up spring 81.

Assuming the valve to be used for governing the flow of steam from the source of supply to a place of use and for controlling the return flow of the medium, the steam or water of condensation, as the case may be, being taken from the place of use of the steam, that is, the place where the steam is condensed, at two points, the flow of the fluids through the valve, and pipes connected therewith, will be as follows: With the valve in the open position, as shown in Fig. 1, the steam entering the supply chamber $a$ from the steam supply pipe 82 passes across the central valve chamber to the inlet chamber $b$, all of the other chambers of the valve casing being shut off from inlet chamber $a$. From the inlet chamber $b$ the steam passes into a pipe 83 to its place of condensation. The water thus condensed re-enters the valve, preferably from two widely separated points in the condensing element, through pipes 85 and 91, the former leading to the first return chamber $f$ and the latter to the second return chamber $c$. The bottom 66 of the valve casing is formed with a web 86 in which is a duct 87 (Figs. 1, 2 and 7) extending from a well 88 in the bottom of chamber $f$ to a well 89 in chamber $c$. With the valve body in the position shown in Fig. 1, water of condensation entering the first return chamber $f$ will flow through this duct 87 to the second return chamber $c$ and from chamber $c$ across the central valve chamber to the discharge chamber $d$. 90 is a discharge pipe leading from chamber $d$. The duct 87 is water sealed to prevent short circuiting of steam from chamber $f$ to chamber $c$. 95, 95′ are wells or depressions in chambers $b$ and $f$ which may be connected by a duct 95″ which will be water sealed. If the steam entering chamber $b$ carries any water it will be trapped in well 95 and pass through duct 95″ into well 95′ from which it may flow through duct 87 to chamber $c$ and thence be discharged.

When the valve is turned from its open position, as shown in Fig. 1, to its closed position, as shown in Fig. 2, the steam entering chamber $a$ passes directly to chamber $d$ and thence into the discharge pipe 90. The other four chambers of the valve are shut off from chambers $a$ and $d$ but are in communication with each other for the purpose of disposal of drainage into the valve from pipes 83, 85, 91. $e$ is the discharge chamber and is connected by a duct 92 in the bottom of the casing with a nipple 93 threaded for a discharge pipe (not shown) which may be employed if desirable. Webs 61 and 62 of the valve body are in such position that chambers $c$, $b$ and $f$ are all open to the central valve chamber and the latter in communication with the drip chamber $e$. 94 is a small drainage opening leading from the space under the valve body into duct 92 to prevent the collection of water in the valve casing underneath the valve.

The valve stem 72 may be rotated by any suitable means. In the drawings the stem is shown as provided with a lever or handle 102.

Operation: With the valve body 57 in the position shown in Fig. 1, steam, or other fluid, from supply pipe 82 may pass through chamber $a$ and the central valve chamber, to chamber $b$ and thence into pipe 83 connected with the steam condensing element (not shown). Fluid from the steam condensing element, water of condensation, for example, is returned to the valve through pipes 85 and 91. These pipes preferably tap the steam in the condensing element at remote points. Water flowing into chamber $f$ through pipe 85 passes through duct 87 to chamber $c$ from which it flows, together with the water from pipe 91, through the central valve chamber into the outlet chamber $d$, and thence to the outlet pipe 90. If steam should enter chamber $f$ its flow will be stopped by the water in the water sealed duct 87.

With the valve body 57 turned to the position shown in Fig. 2, steam is cut off from pipe 83, chamber $a$ being now in communication with chamber $d$ so that the steam will short circuit from pipe 82 to pipe 90. Water of condensation returned to chambers $b$, $c$ and $f$ will pass through the central chamber and into chamber $e$ whence it is discharged through duct 92.

We claim:

1. A valve comprising, in combination, a casing having a plurality of chambers, a revoluble valve body in said casing provided on the top with a circular rib formed with diametrically arranged slots, a bonnet for the top of the casing, and a valve stem having a transverse head bearing against the under surface of the bonnet and against the top of said valve and extending into said slots.

2. A valve comprising, in combination, a casing having a plurality of chambers, a revoluble valve body in said casing provided on the top with a circular rib formed with diametrically arranged slots, a bonnet for the top of the casing, and a valve stem having a transverse head bearing against the under side of the bonnet and against the top of said valve and extending into said slots, said slots and head being formed so that the head is irreversible.

3. A valve comprising, in combination, a casing having a plurality of chambers, a revoluble valve body in said casing, a bonnet for the top of the casing, a gland fixed in said bonnet, a stem for the valve body extending through said bonnet and gland, and packing members in said gland and bonnet which are smaller in diameter than the spaces they occupy.

4. A valve comprising, in combination, a casing having a plurality of chambers, a revoluble valve body in said casing, a bonnet for the top of the casing, a gland fixed in said bonnet, a stem for the valve body extending through said bonnet and gland packing members in said gland and bonnet which are smaller in diameter than the spaces they occupy, and a spring interposed between said packing members.

5. A valve comprising, in combination, a casing having a plurality of chambers, a revoluble valve body in said casing, a bonnet for the top of the casing, a gland fixed in said bonnet, a stem for the valve body extending through said bonnet and gland, packing members in said gland and bonnet which are smaller in diameter than the spaces they occupy, and a spring interposed between said packing members, the gland and body and the ends of the packing members being formed with conical surfaces.

6. A valve comprising a casing having a central valve chamber and a plurality of chambers comprising a supply and a discharge chamber arranged around said valve chamber, a valve rotatable in said valve chamber constructed so that in one position one of the chambers other than the supply and discharge chambers is in communication with the discharge chamber and another of said members is shut off from the discharge chamber; said casing being formed to provide a liquid sealed duct between said other two specified chambers.

7. A valve comprising a central valve chamber and a supply chamber, a discharge chamber and a third chamber arranged around said valve chamber, a valve body in said valve chamber adapted in one position to put said third chamber in communication with the supply chamber; said valve casing being formed with a liquid sealed duct leading from said third chamber to the outlet side of said valve when said valve body is in the position mentioned.

8. A valve comprising a casing having a central valve chamber and arranged around said valve chamber a supply chamber, a discharge chamber and two chambers adapted to receive fluid returned to the valve, a valve body in said valve chamber which in one position places one of said return chambers in communication with the discharge chamber; said valve casing being formed to provide a water sealed duct between said return chambers.

9. A valve comprising a casing, having a central valve chamber, and arranged around said chamber, a supply chamber, a drip chamber, a first return chamber, an inlet chamber, a second return chamber, and a discharge chamber, and a rotary valve body in said valve chamber comprising upper and lower disks joined by three webs arranged so that in one position of the valve body, the inlet chamber is in communication with the supply chamber and the second return chamber is in communication with the discharge chamber and the opening from the central valve chamber to the drip chamber and the first return chamber blocked off, while in the other position of said valve body, the discharge chamber is in communication with the supply chamber and the second return chamber, the inlet chamber and the first return chamber in communication with the drip chamber; said casing being formed with a discharge duct from the drip chamber, and with a liquid sealed duct connecting the first return and the second return chamber.

10. A valve comprising a casing, having a central valve chamber and arranged around said valve chamber, a supply chamber, a drip chamber, a first return chamber, an inlet chamber, a second return chamber, and a discharge chamber, and a rotary valve body in said valve chamber comprising upper and lower disks, joined by three webs arranged so that in one position of the valve body, the inlet chamber is in communication with the supply chamber and the second return chamber is in communication with the discharge chamber, and the openings from the central valve chamber to the drip chamber and the first return chamber are blocked off, while in the other position of said valve body, the discharge chamber is in communication with the supply chamber, and the first return, inlet and second return chamber are in communication with the drip chamber; said casing being formed with a discharge duct from the drip chamber and with a liquid sealed duct connecting the first return chamber with the second return chamber and with a water sealed duct connecting the inlet chamber with the first return chamber.

11. A valve comprising a casing having a central valve chamber, and arranged around said valve chamber, a supply chamber, a drip chamber, a first return chamber, an inlet chamber, a second return chamber and a discharge chamber, and a rotary valve body in said valve chamber, comprising upper and lower disks joined by three webs arranged so that in one position of the valve body the inlet chamber is in communication with the supply chamber, and the second return chamber is in communication with the discharge chamber, and the openings from the central valve chamber to the drip and first return chambers, are blocked off, while in the other position of said valve body, the discharge chamber is in communication with the supply chamber, and the first return, inlet, and second return chambers, are in communication with the drip chamber; the first and second return chambers being formed with wells connected by a duct extending through the valve casing.

12. A valve comprising a casing, having a central valve chamber and arranged around said valve chamber, a supply chamber, a drip chamber, a first return chamber, an inlet chamber, a second return chamber and a discharge chamber, and a rotary valve body in said valve chamber comprising upper and lower disks joined by three webs arranged so that in one position of the valve body the inlet chamber is in communication with the supply chamber, and the second return chamber is in communication with the discharge chamber, and the openings from the central valve chamber to the drip and first return chamber are blocked off, while in the other position of said valve body the discharge chamber is in communication with the supply chamber and the second return chamber, the inlet and the first return chambers are in communication with the drip chamber; the first return and second return chambers being formed with wells connected by a duct extending through the valve casing, and the inlet chamber being formed with a well connected by a duct with the well in the first return chamber.

13. A valve comprising a casing having a central valve chamber, and arranged around said valve chamber, a supply chamber, a drip chamber, a first return chamber, an inlet chamber, a second return chamber, and a discharge chamber, and a rotary valve body in said valve chamber, comprising upper and lower disks joined by three webs arranged so that in one position of the valve body the inlet chamber is in communication with the supply chamber and the second return chamber is in communication with the discharge chamber, and the opening from the central valve chamber to the drip and first return chambers are blocked off, while in the other position of said valve body the discharge chamber is in communication with the supply chamber, and the first return, the inlet and the second return chambers are in communication with the drip chamber; the inlet chamber being provided with a liquid sealed drainage duct, communicating with the outlet side of the valve when the valve member is in the first mentioned position, for ridding the gaseous fluid passing from the inlet chamber of its liquid content.

14. A valve comprising a casing, having a central valve chamber and arranged around said chamber, a supply chamber, a drip chamber, a first return chamber, an inlet chamber, a second return chamber, and a discharge chamber, and a rotary valve body in said valve chamber comprising upper and lower disks joined by three webs arranged so that in one position of the valve body the inlet chamber is in communication with the supply chamber and the second return chamber is in communication with the discharge chamber, and the openings from the central valve chamber to the drip and first return chambers are blocked off, while in the other position of said valve body, the discharge chamber is in communication with the supply chamber and the first return, inlet and second return chambers are in communication with the drip chamber; said casing being formed with a liquid sealed duct extending from the first return chamber and the inlet chamber, to the outlet side of the valve when said valve body is in the first-named position.

15. A valve comprising in combination, a casing having a plurality of chambers, a revoluble valve body in said casing, a bonnet for the top of the casing, a gland fixed in said bonnet, a stem for the valve extending through said bonnet, and gland, packing members in said gland, and bonnet, which normally turn with the valve stem, and which are smaller in diameter than the spaces they occupy, and a spring interposed between said packing members and gland, and the ends of the packing members being formed with conical surfaces.

PAUL B. PARKS,
JOHN VAN VULPEN.